O. MILLER.
LEVER LOCK.
APPLICATION FILED NOV. 5, 1921.
1,421,021.
Patented June 27, 1922.
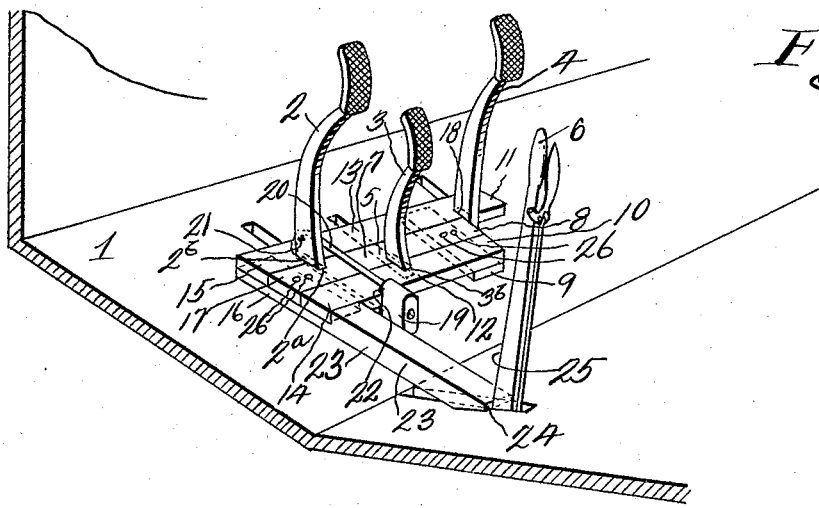
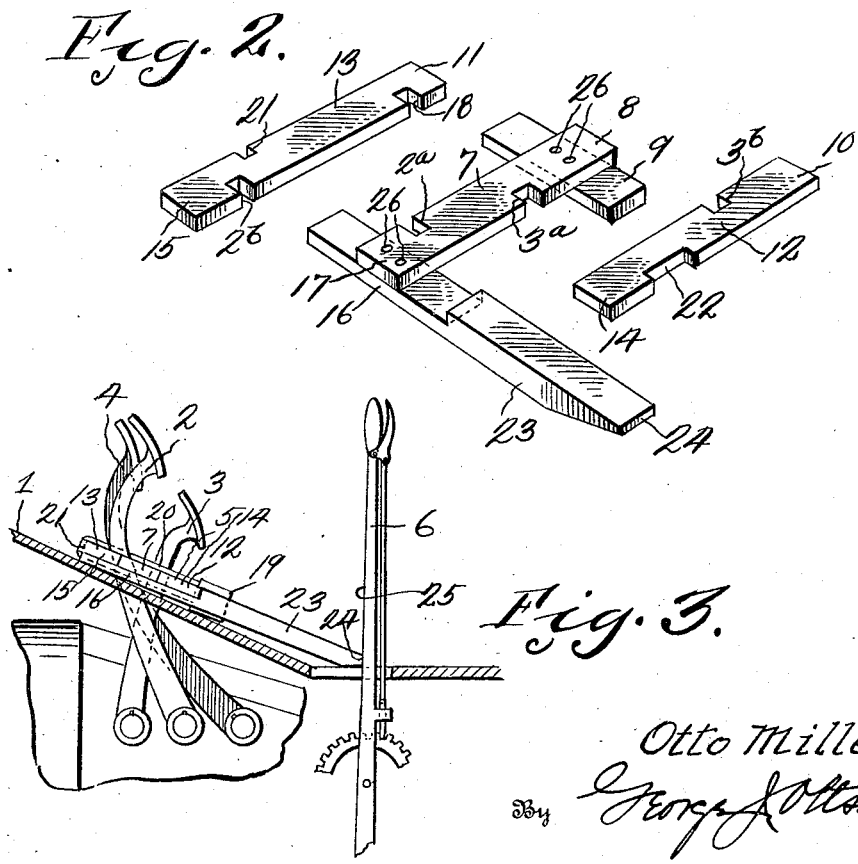
Inventor
Otto Miller
By George J. Oltsch
Attorney

UNITED STATES PATENT OFFICE.

OTTO MILLER, OF LAKE TOWNSHIP, BERRIEN COUNTY, MICHIGAN.

LEVER LOCK.

1,421,021.  Specification of Letters Patent.  Patented June 27, 1922.

Application filed November 5, 1921. Serial No. 513,024.

*To all whom it may concern:*

Be it known that I, OTTO MILLER, a citizen of the United States, residing in Lake Township, in the county of Berrien and State of Michigan, have invented certain new and useful Improvements in Lever Locks, of which the following is a specification.

The invention relates to lever locks, for the control levers of automobiles, and has for its object to provide a device of this character comprising elongated bars having notches in their edges for the reception of the levers, said bars being adapted to engage opposite sides of the levers and held in close engagement with the levers and in engagement with each other by the U-shaped bail of a lock.

A further object is to provide in combination with adjacent clutch, reverse, and brake levers, means for locking the levers together comprising a bar having its opposite edges notched and adapted to be disposed between the levers, said bar having transversely disposed bars at its ends, which transversely disposed bars receive removable notched bars which engage the outer sides of the levers and are held in close engagement with each other and with the levers by means of an elongated bail carried by a lock. Also to provide one of the transversely disposed members with an arm, which arm abuts one side of the emergency brake lever of the automobile and holds the same in rearward position, thereby preventing release of the emergency brake, and preventing the automobile from being towed away.

With the above and other objects in view the invention resides in the combination and arrangements of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the lever lock showing the same applied to the control levers of an automobile.

Figure 2 is a detail perspective collective view of the various parts of the lever lock.

Figure 3 is a side elevation of the lever lock showing the same in position for locking the levers of an automobile and showing the floor boards of an automobile in section.

Referring to the drawing, the numeral 1 designates the flooring of an automobile body, through which flooring the various controlling levers for the automobile extend to a point within reach of the operator. A conventional form of internal combustion engine of an automobile is controlled through a clutch lever 2, a reverse lever 3 and a brake lever 4, said levers being preferably operated by the foot of the operator. To prevent an unauthorized person from operating the automobile, the levers 2, 3 and 4 which control the clutch, the reverse, and the brake mechanism are locked together by means of a lever lock 5. The emergency brake 6 is also preferably locked against forward movement to an inoperative position, after the same has been moved rearwardly to set the emergency brakes, thereby additionally locking the automobile and locking the same in such a manner that if an attempt is made to tow the vehicle away, the vehicle will be prevented from movement.

The lever lock 5 comprises a centrally disposed bar 7, which is adapted to be placed between the levers 2 and 4, and the lever 3 in such a manner that the lever 2 will be received in the notch 2$^a$ of the bar 7 and the lever 3 in the notch 3$^a$ of the bar 7. The levers 2 and 3 when disposed in the notches 2$^a$ and 3$^a$ present longitudinal displacement of the bar 7. Secured to the end 8 of the bar 7 is a transversely disposed bar 9, the ends of which extend beyond the sides of the bar 7 and form seats for the ends 10 and 11 of the bars 12 and 13, which bars are provided with notches 3$^b$ and 2$^b$, which register with the notches 3$^a$ and 2$^a$ when the bars 12 and 13 are placed in position in engagement with the bar 7 and receive the outer sides of the levers 2 and 3, said bars 12 and 13 when in place being prevented against longitudinal movement by the levers 2 and 3. The ends 14 and 15 of the bars 12 and 13 rest upon a transversely disposed bar 16 carried by the end 17 of the bar 7 which forms a seat for the ends 14 and 15 of the bars 12 and 13, and also forms means whereby said bars will be maintained in the same plane as the bar 7. After the bars 7 and 12 have been assembled as above set forth, the lever 4 which is a brake lever will be received in the notch 18 of the bar 13, which notch when the bar 13 is in position is disposed beyond the end 8 of the bar 7, however it is held from forward movement by the bar 13. After the bars 7 and 12 and 13 have been properly positioned, they are securely locked together by means of a lock 19, the U-shaped bail 20 of which extends over the bars 13, 7 and 12 and has its transverse portion disposed in a notch 21 of the bar 13, and its lock in close engagement with the bottom of the notch 22 of the bar 12, therefore it will be seen that the bail of the lock will form additional means for preventing longitudinal movement of the bars 12 and 13, and that the bail 20 of the lock will maintain the bars 7, 12 and 13 in the same plane at all times, thereby preventing various parts of the lever lock from being displaced in relation to each other. It will be seen that the levers are locked together in such a manner that they cannot have independent movement and consequently it would be impossible for anyone to control the various mechanisms of the automobile while the lock 5 is in place. Extending rearwardly from the bar 16 is a rearwardly extending arm 23, the end 24 of which engages the forward side 25 of the emergency brake lever 6 when said lever is in its rearward position as shown in Figure 1, the rearward position being the operative position, and consequently after the emergency brake has been set the arm 23 will prevent the release of the emergency brake by forward movement of the lever 6.

From the above it will be seen that a lever lock is provided, which is simple in construction, and one which may be easily placed in position in such a manner as to positively lock all of the levers of an automobile against movement. If so desired the bars 7, 9 and 16 may be formed from a single piece of material instead of being riveted together as at 26.

The invention having been set forth what is claimed as new and useful is:—

The combination with a clutch lever, a reverse lever, a brake lever disposed substantially side by side and spaced from each other and an emergency brake lever disposed rearwardly of said levers, of a locking device for locking all of said levers against movement, said device comprising a bar disposed between the clutch and brake levers and the reverse lever and having notches for receiving the sides of said levers, transversely disposed bars carried by the ends of said bar, notched bars disposed on the ends of the transversely disposed bars and adapted to receive the outer sides of said levers, a locking member for locking said bars against edgewise displacement and a rearwardly extending arm carried by one of the transversely disposed bars and having its end in abutting engagement with the emergency brake lever.

In testimony whereof I affix my signature.

OTTO MILLER.